(12) United States Patent
Zhou et al.

(10) Patent No.: US 10,922,390 B1
(45) Date of Patent: Feb. 16, 2021

(54) TRAINING A CLASSIFIER TO IDENTIFY UNKNOWN USERS OF AN ONLINE SYSTEM

(71) Applicant: Facebook, Inc., Menlo Park, CA (US)

(72) Inventors: Hongyan Zhou, Mercer Island, WA (US); Di Wang, Redmond, WA (US); Raj Prateek Kosaraju, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 128 days.

(21) Appl. No.: 16/052,609

(22) Filed: Aug. 2, 2018

(51) Int. Cl.
 *G06F 21/31* (2013.01)
 *G06N 20/00* (2019.01)

(52) U.S. Cl.
 CPC ............ *G06F 21/31* (2013.01); *G06N 20/00* (2019.01)

(58) Field of Classification Search
 CPC ........ G06F 21/31; G06F 21/316; G06N 20/00
 See application file for complete search history.

(56) References Cited

U.S. PATENT DOCUMENTS

| | | | |
|---|---|---|---|
| 7,937,336 B1 * | 5/2011 | Maynard-Zhang | H04L 29/1299 706/12 |
| 2018/0197107 A1 * | 7/2018 | Belous | G06N 5/022 |
| 2019/0273789 A1 * | 9/2019 | Modarresi | G06N 20/20 |

OTHER PUBLICATIONS

Zadrozny, B. "Learning and evaluating classifiers under sample selection bias", Proceedings of the twenty-first international conference on Machine learning, 2004, 8 pages.

* cited by examiner

*Primary Examiner* — Farid Homayounmehr
*Assistant Examiner* — Suman Debnath
(74) *Attorney, Agent, or Firm* — Fenwick & West LLP

(57) ABSTRACT

An online system develops a model to predict the identity of unknown users accessing the online system. The online system interacts with users who are known by the online system (e.g., because they are logged in), termed known users, and users who are unknown by the online system. The model attempts to predict the identity of unknown users. To train the model, a set of training data with training weights is generated. The training data includes a set of access events from known users. The set can include access events from unknown users who accessed the system and subsequently became identified (referred to as hindsight events). To account for a distribution in training data, the training data is applied to a scoring model to identify training data that resembles known events. A scaling model then scales the scores to generate training weights. The weights may be higher for access events with characteristics that resembles hindsight events.

20 Claims, 8 Drawing Sheets

| Event | Class |
|---|---|
| E | 1 |
| E | 1 |
| E | 1 |
| E | 1 |
| E | 1 |
| E | 1 |
| E | 1 |
| E | 1 |
| E | 1 |
| E | 1 |

| Event | Class | Score |
|---|---|---|
| E | 1 | 0.5 |
| E | 1 | 0.8 |
| E | 1 | 0.9 |
| E | 1 | 0.6 |
| E | 1 | 0.87 |
| E | 1 | 0.95 |
| E | 1 | 0.45 |
| E | 1 | 0.7 |
| E | 1 | 0.8 |
| E | 1 | 0.9 |

Initial Weights 1005

| Event | Class | Score | Scaled |
|---|---|---|---|
| E | 1 | 0.5 | 0.3 |
| E | 1 | 0.8 | 0.85 |
| E | 1 | 0.9 | 0.98 |
| E | 1 | 0.6 | 0.5 |
| E | 1 | 0.87 | 0.92 |
| E | 1 | 0.95 | 0.99 |
| E | 1 | 0.45 | 0.25 |
| E | 1 | 0.7 | 0.75 |
| E | 1 | 0.8 | 0.85 |
| E | 1 | 0.9 | 0.98 |

Final Weights 1010

TRAINING A CLASSIFIER TO IDENTIFY UNKNOWN USERS OF AN ONLINE SYSTEM

BACKGROUND

This disclosure relates generally to identifying unknown users accessing content of an online system. More specifically, this disclosure relates to training a classifier to predict the identity of unknown users from access events representing interactions of a device with content.

Client devices can access content from one or more systems via a network. In accordance with user permissions, information describing these access events can be sent to an online system. If access events can be associated with users of the online system, the online system can use user information and access event information to provide relevant content to its users (e.g., users who opt in). However, many access events are not associated with users of the online system (e.g., a user is not logged in to the online system). Thus, the online system can present irrelevant content or overly repetitious content to users.

SUMMARY

In accordance with user permissions, an online system receives information describing characteristics of one or more access events. An access event defines a context in which a client device accesses one or more online systems via a network (e.g., a client device accesses content of the online system). This information can be information that was explicitly shared during the access event and may also include information inferred or derived by the online system. Data items that describe an access event can include a cookie, a browser ID, a device ID, an HTML request, and an IP address. An access event may be described by any combination of these data items. For example, in some embodiments, an access event is a set of data items that identify a client device.

Depending on the access event information received by the online system, the online system can determine whether an access event is associated with a specific user. An access event associated with a user of the online system at a time the access event occurred is referred to as a synched event. For example, if an access event is used to log into an account on the online system, the online system can associate the access event with a user at the time the access event occurred.

An access event not associated with a user of the online system is referred to as an unsynched event. For example, if an access event is not used to log into an account on the online system, the online system may be unable to associate the access event with a particular user. Unsynched events can include access events from non-users (e.g., a person who is not a user of the online system) and unknown users. An unknown user is a user of the online system responsible for one or more unsynched events. In some cases, an unsynched event becomes associated with a user at a time after the access event occurred. These access events (that become synchronized) are referred to as hindsight events. For example, if device ID is associated with a user through a known event, then unsynched events associated with the same device ID may become hindsight events. Hindsight events and synched events may be referred to as known events because the users associated with those events are known. Furthermore, users associated with known events may be referred to as a known users.

To predict the identity of unknown users from unsynched events, the online system trains a classifier model. After receiving one or more unsynched events, classifier model can predict one or more users of the online system responsible for the unsynched events. To train the classifier model, a set of training data is generated by the online system. Specifically, the training data includes training weights associated with a set of known events. A training weight determines an amount of influence a known event will have on the training of the classifier model. For example, the training data is weighted such that known events with characteristics similar to those of hindsight events have a higher training weight than other known events. In this way, the training may emphasize samples of training data that are similar to users were unsynchronized when the event occurred but who later became synchronized.

The training weights are determined by a scoring model and a scaling model. The scoring model is a classifier that determines an initial set of training weights by calculating and applying scores to a set of known events. A score reflects a likelihood of an access event being associated with a known user or an unknown user. The scoring model can be trained from a sampled subset of access events including a substantially equal proportion of known events and unsynched events. This can allow the scoring model to equally consider whether an access event is a known event (i.e., synchronized at the time of the event or as a hindsight event) or unsynched event. To account for an access event distribution bias, the scores from the scoring model are scaled by the scaling model to create a final set of training weights in the training data for the classifier. The scaling model can be trained based on an unsampled subset of access events. Thus the ratio of unsynched events to known events in the scaling model training data is substantially equal to a ratio of unsynched events to known events as they actually occur.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
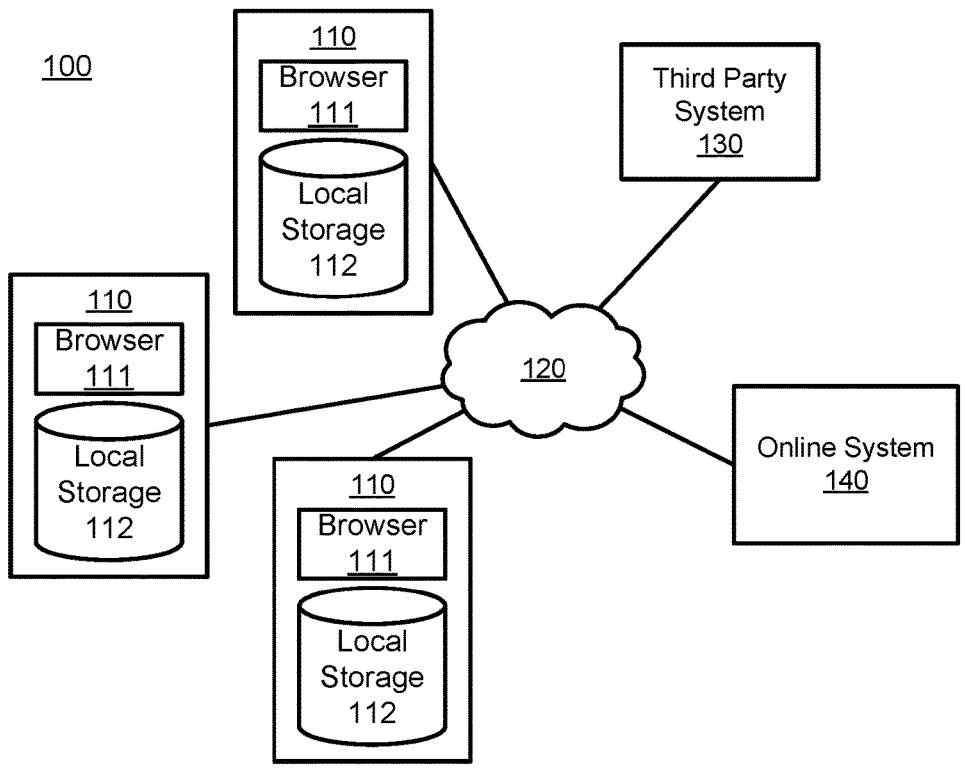
FIG. 1 is a block diagram of a system environment in which an online system operates, in accordance with an embodiment.

FIG. 1 is a block diagram of a system environment 100 for an online system 140, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

In the system environment shown in FIG. 1, client devices 110 can access content from the online system 140 and the third party system 130 via the network 120. When a client device 110 accesses content, information regarding the access event can be reported to the online system 140. Each access event can be associated with information and a context in which the access event occurred. For example, an access event is associated with a unique combination of one or more data item values that define the context for the client device 110 accessing the online system 140 or the third party system 130.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application (also referred to as a browser 111) to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Each client device 110 includes a local storage 112 for storing data. The local storage 112 may store data associated with a browser 111. The browser 111 receives web pages from various systems and executes instructions based on the web pages. In an embodiment, the browser 111 stores data received from various online systems in the local storage 112, for example, for caching data for fast access, or for storing cookies of various websites or online systems. Cookies represent data received from an online system that is stored on the client device 110 that may be provided to the online system when the client device 110 sends requests to the online system. For example, an online system may store user preferences as cookies. Data stored in the local storage 112 may be associated with an access event initiated by the client devices 110. For example, a browser ID stored in the local storage 112 may be used to describe an access event.

One or more third party systems 130 may be coupled to the network 120 for communicating with the online system 140 and client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In some embodiments, the third party system 130 uses a tracking pixel or piece of HTML code placed by the third party system 130 on third-party websites to monitor users visiting the websites that have not opted out of tracking. A tracking pixel might be included on various pages, including on a product page describing a product, on a shopping cart page that the user visits upon putting something into a shopping cart, on a checkout page that the user visits to checkout and purchase a product, etc. For example, a tracking pixel results in a transparent 1×1 image, an iframe, or other suitable object being created for third party pages. When a user's browser 111 loads a page having the tracking pixel, the tracking pixel results in the user's browser 111 attempting to retrieve the content for that pixel, and the browser 111 contacts the online system 140 to retrieve the content. The request sent to the online system 140 can include various data about the user's actions taken on the third party website. In some embodiments, the third party website controls what data is sent to the online system 140. For example, the third party system 130 includes information about the page the user is loading (e.g., a product page, a shopping cart page, a checkout page, etc.), information on the page or a product on the page (e.g., the SKU number of the product, the color, the size, the style, the current price, any discounts offered, the number of products requested, etc.), information about the user (e.g., the third party's user identifier (UID), contact information for the user, etc.), and other data. In some embodiments, a cookie set by the online system 140 can also be retrieved by the online system 140, which can include various data about the user, such as the online systems' UID for the user, information about the client device 110 and the browser 111, such as the Internet Protocol (IP) address of the client device 110, among other data. Tracking can also be performed on mobile applications of content providers by using a software development kit (SDK) of the online system 140 or via an application programming interface (API) of the online system 104 to track access events (e.g., purchases) that occur by users on the content provider's app that are reported to the online system 140.

For a user who has provided consent, the online system 140 can then use this data received about the user to serve better content to the user in the future (e.g., since the online system 140 has further data about products purchased or web sites browsed that might be of interest). User permissions allowing, the online system 140 can also use this data in conversion tracking and reporting results of advertising campaigns to the third party system 130. For example, if the third party system 130 has spent money at the online system 140 to have the online system 140 serve ads for its products, and a particular user views an ad on the online system 140 and then purchases the product advertised (possibly at some point later, and possibly on a different device), the online system 140 can link the purchase/conversion to the ad originally shown on the online system 140. Thus, the online system 140 can include this data in its reporting to the third party system 130 of how many conversions the ad campaign received.

As described above, the online system 140 is configured to receive information (in accordance with user permissions) from client devices 110 when the client devices 110 access an online system via the network 120. Specifically, the online system 140 receives information from the client devices 110 that describes access events. From this received information a client device 110 or user may be associated with one or more access events. The online system 140 is discussed in greater detail below with regard to FIG. 2.

Figure 2:
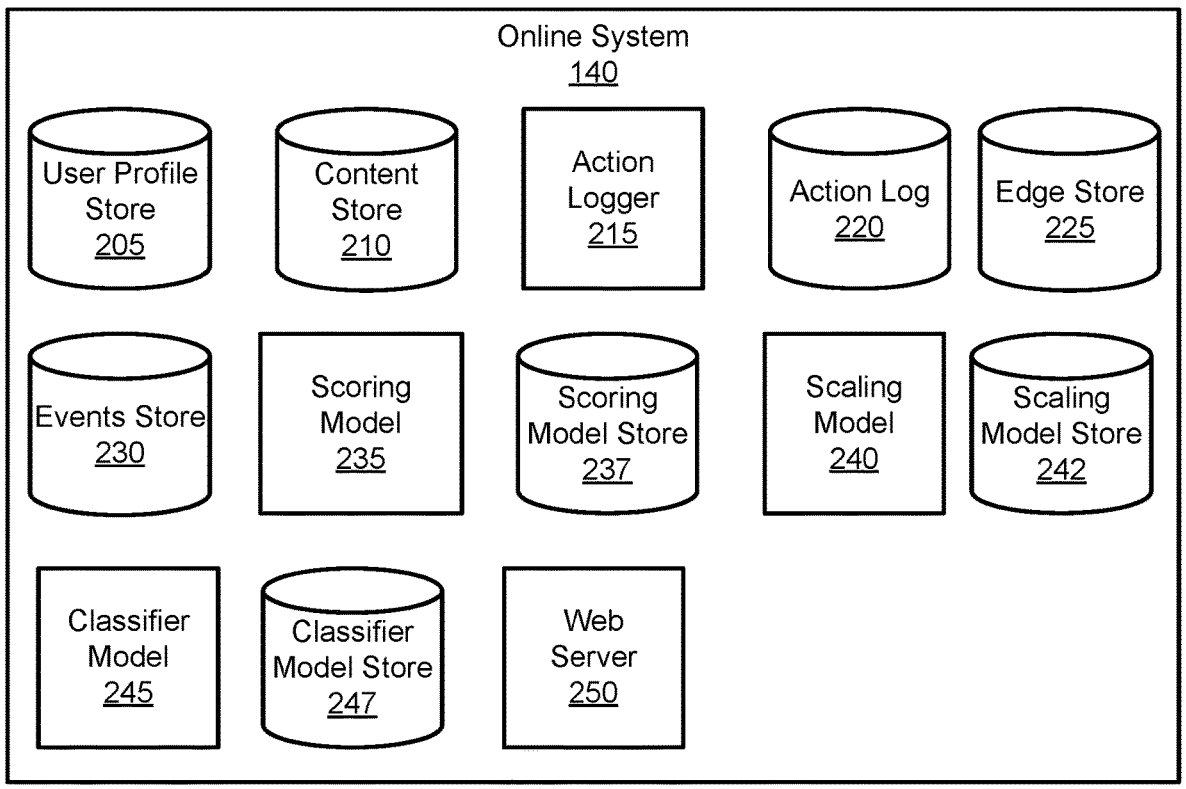
FIG. 2 is a block diagram of an online system, in accordance with an embodiment.

FIG. 2 is a block diagram of an architecture of the online system 140, in accordance with an embodiment. The online system 140 shown in FIG. 2 includes a user profile store 205, a content store 210, an action logger 215, an action log 220, an edge store 225, an events store 230, a scoring model 235, a scoring model store 237, a scaling model 240, a scaling model store 240, a classifier model 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In certain embodiments, a user profile stored in the user profile store 205 also includes references to one or more access events that have been determined to be associated with the user profile. As noted above, an access event is described by a unique combination of one or more data item values that define a context for a client device 110 interacting with systems (e.g., the online system 140) via the network 120. Data items that can describe an access event include but are not limited to a cookie, a browser ID, a device ID, an HTML request, and an IP address. An access event may be described by any combination of these data items. For example, in some embodiments, an access event is a set of data items that identify a client device 110. In such embodiments, an access event may comprise a device ID. In alternative embodiments, an access event may comprise both a device ID and a browser ID cookie. In alternative embodiments, an access event may comprise an alternative combination of data items.

Returning to the user profile store 205, one or more access events can be associated with a user profile. For example, an access event that accessed a user profile of the online system 140 via the network 120 may be associated with the user profile that was accessed. Thus the access event is associated with the user profile, and the access event is associated with the user of the user profile. As noted above, an access event that has been determined to be associated with a particular user is referred to as a known event and the particular user is referred to as a known user.

In certain cases, an access event that is detected by the online system 140 is not associated with a user profile stored in the user profile store 205. For example, the access event might never access or be associated with a user profile stored on the online system 140. In such cases, the online system 140 does not associate the access event with a particular user of the online system 140. As noted above, an access event that has not been determined to be associated with a particular user is referred to as an unsynched event. When an unsynched event is detected by the online system 140, the unsynched event is stored in the events store 230.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups, or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile, and allowing a more complete understanding of user preferences. The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The events store 230 contains access events and information describing characteristics of one or more access events detected by the online system 140. For instance, the events store 230 may maintain references to access events performed by a user or client device. For example, client device 110 may be associated with a frequency at which a client device 110 requests content or web pages. For instance, if a client device 110 requests access to the third party content provider system 130, the request may be associated with the client device 110 or a user associated with the client device 110. A number of access events may involve an object and one or more particular users, so these access events are associated with those users as well and stored in the events store 230.

Access events stored in the events store 230 includes unsynched events and known events. Unsynched events are access events that are not associated by the online system 140 with a user of the online system 140. Known events are access events that are associated by the online system 140 with a user of the online system 140. Known events 315 include synched events and hindsight events. A synched event is an access event that is associated by the online system 140 with a user of the online system 140 at the time the access event occurred. For example, a user is synchronized (e.g., logged in) with the online system 140 at the time the access event occurred. A hindsight event is an access event that is associated by the online system 140 with a user of the online system 140 at a time after the access event occurred. For example, a user synchronizes (e.g., logs in) with the online system 140 after one or more access events. Further information about types of access events can be found with reference to FIGS. 3 and 4.

The information describing characteristics of one or more access events can be information that was explicitly shared during an access event and may also include information inferred or derived by the online system 140. Examples of information associated with an access event include biographic, demographic, and other types of descriptive information, such as work experience, educational history, gender, hobbies, or preferences, location and the like. For example, when demographic information is input into an online system during an access event, the demographic information may be associated with the access event. An access event may also be associated with other information provided, for example, images, or videos. The data items and actions that describe an access event may increase in quantity and complexity as the quantity and complexity of interactions between the client device 110 and the online system 140 increase over time.

The scoring model 235 is a machine learned classifier that scores access events. A score determined by the scoring model 235 reflects a likelihood of the access event being associated with a user of the online system 140. For example, an event score of "0.95" may indicate a high likelihood that the access event is associated with a user of the online system 140 (e.g., a synched event or hindsight event). To determine a score for an access event, the scoring model 235 receives information describing characteristics of the access event, such as the IP address of the client device 110, time of day of the access event occurred, etc. In some embodiments, the scoring model 235 receives information associated with multiple access events to determine a single score. For example, a set of access events are associated with a single client device 110.

In some embodiments, the scoring model 235 is a binary classifier. For example, the scoring model 235 applies a score of "1" to an access event that is likely to be a hindsight event and a "0" to an access event that is likely to be an unsynched event. The output of the scoring model 235 can be used as training data to train the scaling model 240. The output of the scoring model 235 can also be used as training data to train the classifier model 245.

The scoring model 235 is trained from training data stored in the scoring model training store 237. The training data in the scoring model store 237 includes a sampled subset of access events (and associated information describing characteristics of the access events) from the events store 230. The sampled subset of access events can include a substantially equal proportion of known and unsynched events. For example, the training data includes an equal portion of hindsight events and unsynched events. In another example, the training data includes an equal portion of synched events and unsynched events.

The scaling model 240 is a machine learned model that scales the scores determined by the scoring model 235 to reflect an adjusted likelihood of the access event being associated with a user of the online system 140. To scale a score of an access event, the scaling model 240 receives information associated with the access event and the score from the scoring model 235. In some embodiments, the scaling model 240 is a logistic regression model that applies Platt scaling. The scaled scores can create training weights for the access events. The training weights associated with the access events can be used to train the classifier model 245. The scaling model 240 is trained to scale the scores based on an unsampled ratio of access events having unknown users and known users. Due to a sampling bias in the scoring model training data, the scoring model 235 may score access events expecting an even distribution of known and unknown events, and therefore may not properly account for the proportion in the complete sample event data. Thus, to correct for the sampling bias, the scores determined by the scoring model 235 can be scaled by the scaling model 240 to adjust the scores to account for the distribution of known events and unsynched events in the events store 230.

In embodiments where the scoring model 235 is a binary classifier, the scaling model 240 can scale the binary score of the access events to reflect a likelihood of the access event being associated with a user of the online system 140. For example, the scaling model 240, given an access event x, calculates the likelihood of the access event being an unsynched event, P(unsynched|x), or a synched event, P(synced|x). For example, if the scoring model 235 applies a score of "1" to an access event, then the scaling model 240 may scale the score to "0.75" (depending on the information associated with the access event) to reflect a likelihood of the access event being associated with a user of the online system 140.

The scaling model 240 is trained from access events in the scaling model store 242. Specifically, the scaling model store 242 includes known and unsynched events (and associated information describing characteristics of the access events) scored by the scoring model 235. In some embodiments, the scored access events in the scaling model store 242 are selected such that the ratio of known events to unsynched events in the scaling model store 242 is similar to the ratio of known events to unsynched events in the event store 230. For example the training data includes a ratio of hindsight events to unsynched events that is substantially equal to a ratio of hindsight events to unsynched events stored in the event store 230. The scaling model 240 and scaled scores are further described with reference to FIGS. 9 and 10.

The classifier model 245 predicts the identity of unknown users from unsynched events. For example, the classifier model 245 identifies a user of the online system 140 who may be responsible for one or more unsynched events. In some embodiments, the classifier model 245 selects a set of users of the online system 140 as candidates and ranks the candidates according to a likelihood of the candidates being an unknown user responsible for one or more unsynched events.

The classifier model 245 is trained from training data in the classifier model store 247. The classifier model store 247 includes known events that can include any combination of hindsight and synched events (and associated information describing characteristics of the access events) from the event store 230. Furthermore, the known events in the classifier model store 247 include associated training weights. The training weights are determined by applying the access events to the scoring model 235 and, subsequently, to the scaling model 240. The scaled scores of the known events act as training weights for the classifier model 245.

The web server 250 links the online system 140 via the network 120 to the one or more client devices 110, as well as to the one or more third party systems 130. The web server 250 serves web pages, as well as other content, such as JAVA®, FLASH®, XML, and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Diagrams of Events and Users

Figure 3:
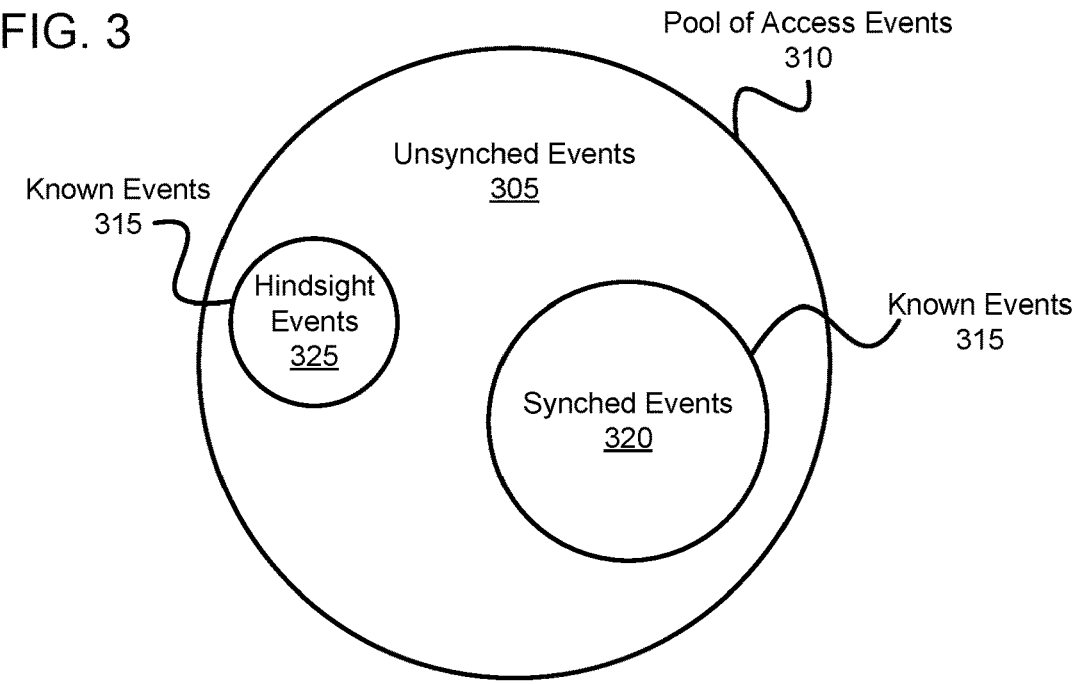
FIG. 3 is a diagram illustrating types of access events, in accordance with an embodiment.

FIG. 3 is a diagram illustrating types of access events, in accordance with an embodiment. The pool of access events 310 is stored in the events store 230 and includes instances of client devices 110 accessing the online system 140. The pool of access events 310 includes unsynched events 305 and known events 315. Unsynched events 305 are access events that are not associated by the online system 140 with a user of the online system 140. Unsynched events 305 can include access events from non-users (e.g., a person who is not a user of the online system 140) and unknown users. An unknown user is a user of the online system 140 responsible for one or more unsynched events 305. Known events 315 are access events that are associated by the online system 140 with a user of the online system 140. Known events 315 include synched events 320 and hindsight events 325. A synched event 320 is an access event that is associated by the online system 140 with a user of the online system 140 at the time the access event occurred. For example, a user is synchronized (e.g., logged in) with the online system 140 at the time the access event occurred. A hindsight event 325 is an access event that is associated by the online system 140 with a user of the online system 140 at a time after the access event occurred. For example, a user synchronizes (e.g., logs in) with the online system 140 after one or more access events.

Figure 4:
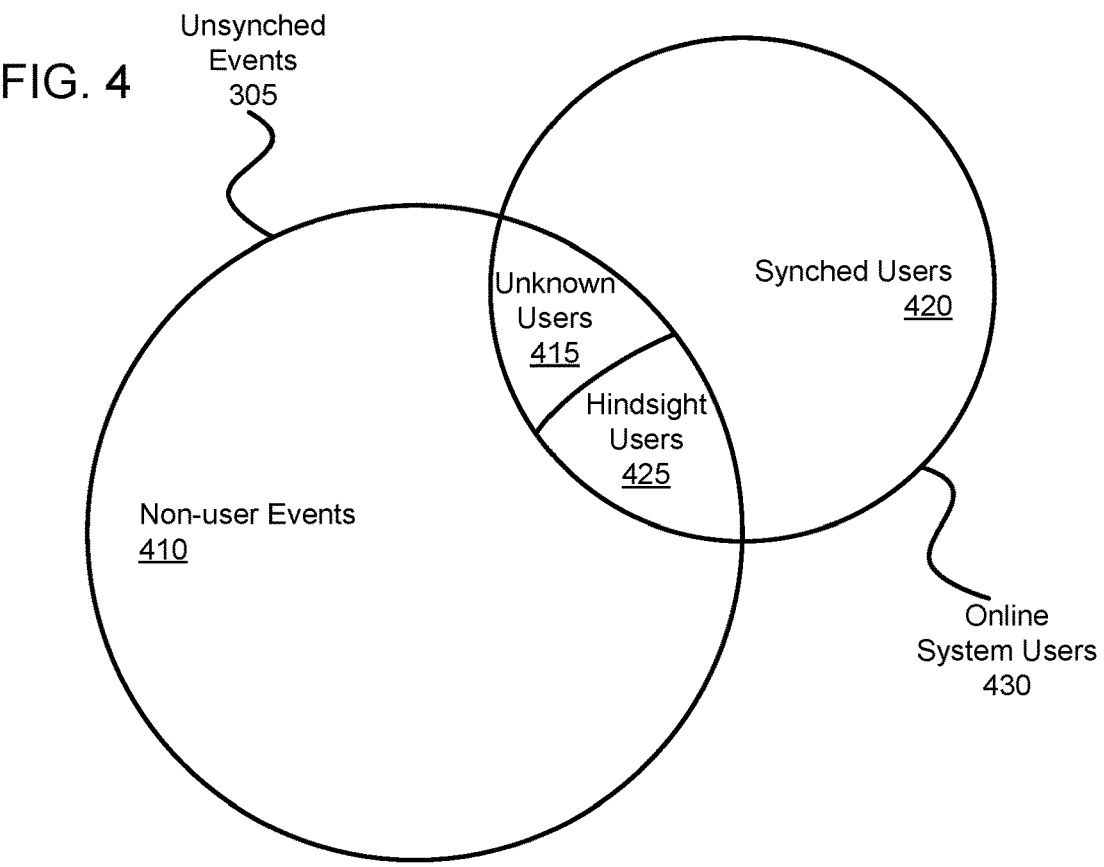
FIG. 4 is a diagram illustrating types of users associated with access events, in accordance with an embodiment.

FIG. 4 is a diagram illustrating types of users associated with access events, in accordance with an embodiment. Online system users 330 are users that create access events by accessing the online system 140. Online system users 330 include synched users 420, hindsight users 425, and unknown users 415. Synched users 420 are synchronized with the online system 140 when they access the online system 140 (e.g. they are logged in to the online system 140 or a cookie identifies the user). Thus, synched users 420 can create synched events 320. Hindsight users 425 are associated by the online system 140 with hindsight events 325. Synched users 420 and hindsight users 425 may be referred to as known users. Unknown users 415 are not synchronized with the online system 140 when they access the online system 140, thus unknown users 415 create unsynched events 305. Unsynched events 305 may also include non-user events 410 that are made by non-users, such as people who is not users of the online system 140.

Training the Classifier Model

Figure 5:
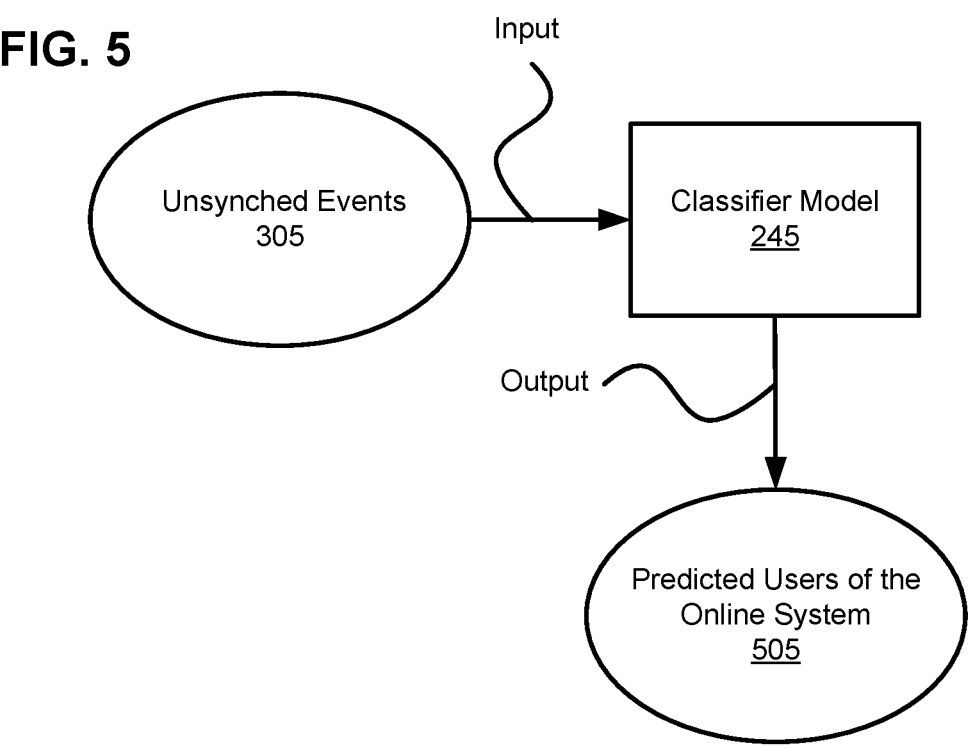
FIG. 5 is a diagram illustrating the inputs and outputs of the classifier model, in accordance with an embodiment.

FIG. 5 is a diagram illustrating the inputs and outputs of the classifier model 245, in accordance with an embodiment. The classifier model 245 receives one or more unsynched events 305 as input. Using the input, the classifier model 245 predicts one or more users of the online system 505 responsible for the unsynched events 305.

Figure 6:
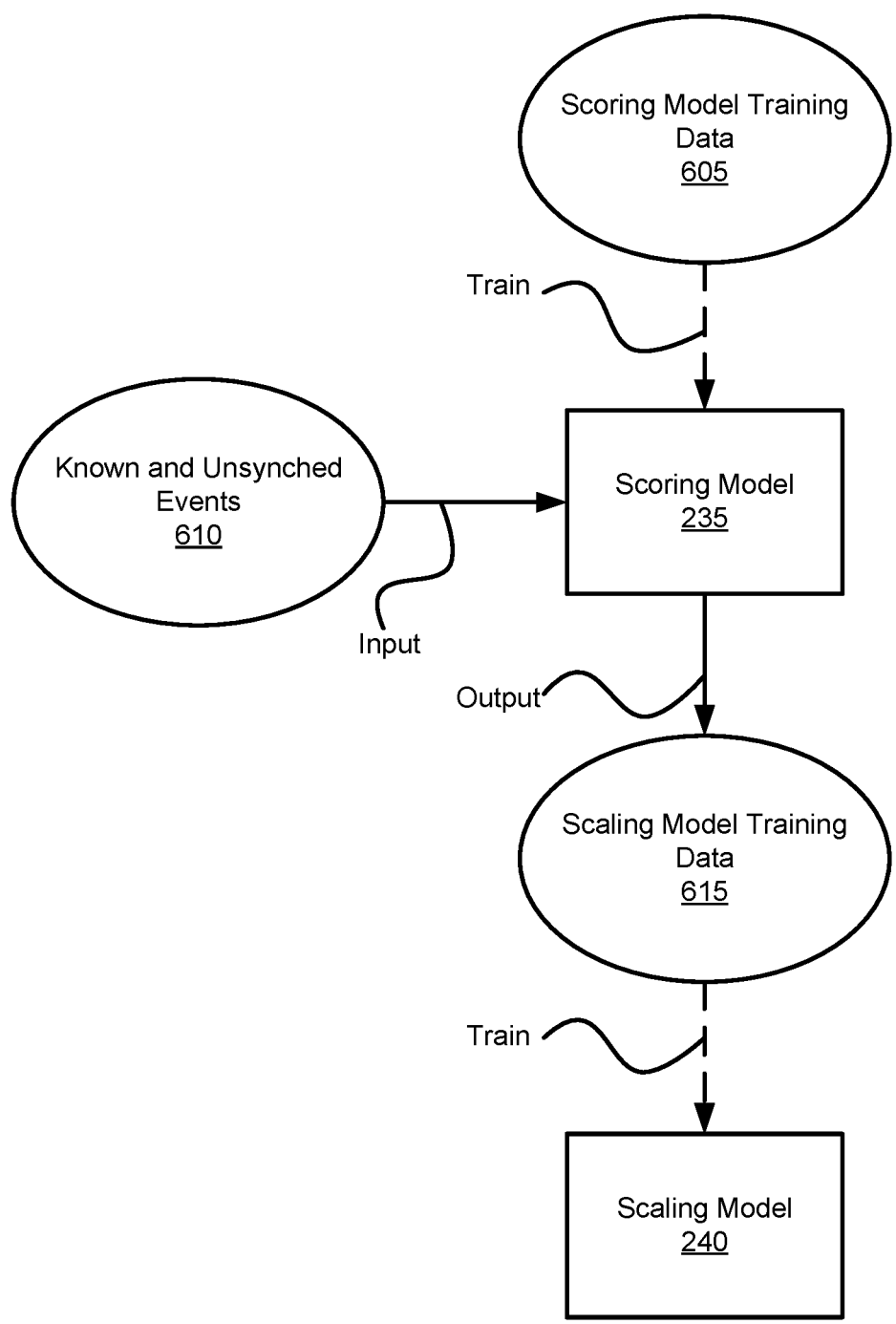
FIG. 6 is a diagram illustrating a method of generating scaling model training data, in accordance with an embodiment.

FIG. 6 is a diagram illustrating a method of generating scaling model training data 615, in accordance with an embodiment. The scoring model 235 is trained from scoring model training data 605 stored in the scoring model store 237. The scaling model 240 is trained from scaling model training data 615 stored in the scaling model store 242. The scaling model training data 615 includes known and unsynched events 610 scored by the scoring model 235.

The scoring model training data 605 can be sampled to include a substantially equal proportion of unsynched events 305 and known events 315. If the scoring model training data 605 only includes known events 315, then the scoring model 235 may incorrectly score unsynched events 305. Similarly, if the scoring model training data 605 only includes unsynched events 305, then the scoring model 235 may incorrectly score known events 315. Thus, an equal portion of unsynched events 305 and known events 315 can be used to train the scoring model 235 to score both unsynched events 305 and known events 315.

In embodiments where the scoring model training data 605 includes a substantially equal proportion of unsynched events 305 to known events 315, the scoring model 235 may score access events with a sampling bias, since the number of unsynched events 305 in the pool of access events 310 may not equal the number of known events 315. To account for this, the scaling model 240 can be trained to scale scores from the scoring model 235 to reduce sampling biases from the scoring model 235. To do this, the known and unsynched events 610 (and thus the scaling model training data 615) can include an unsampled set of access events. As such, the scaling model training data 615 includes a ratio of scored unsynched events 305 to scored known events 315 equaling a ratio of unsynched events 305 to known events 315 in the pool of access events 310.

Figure 7:
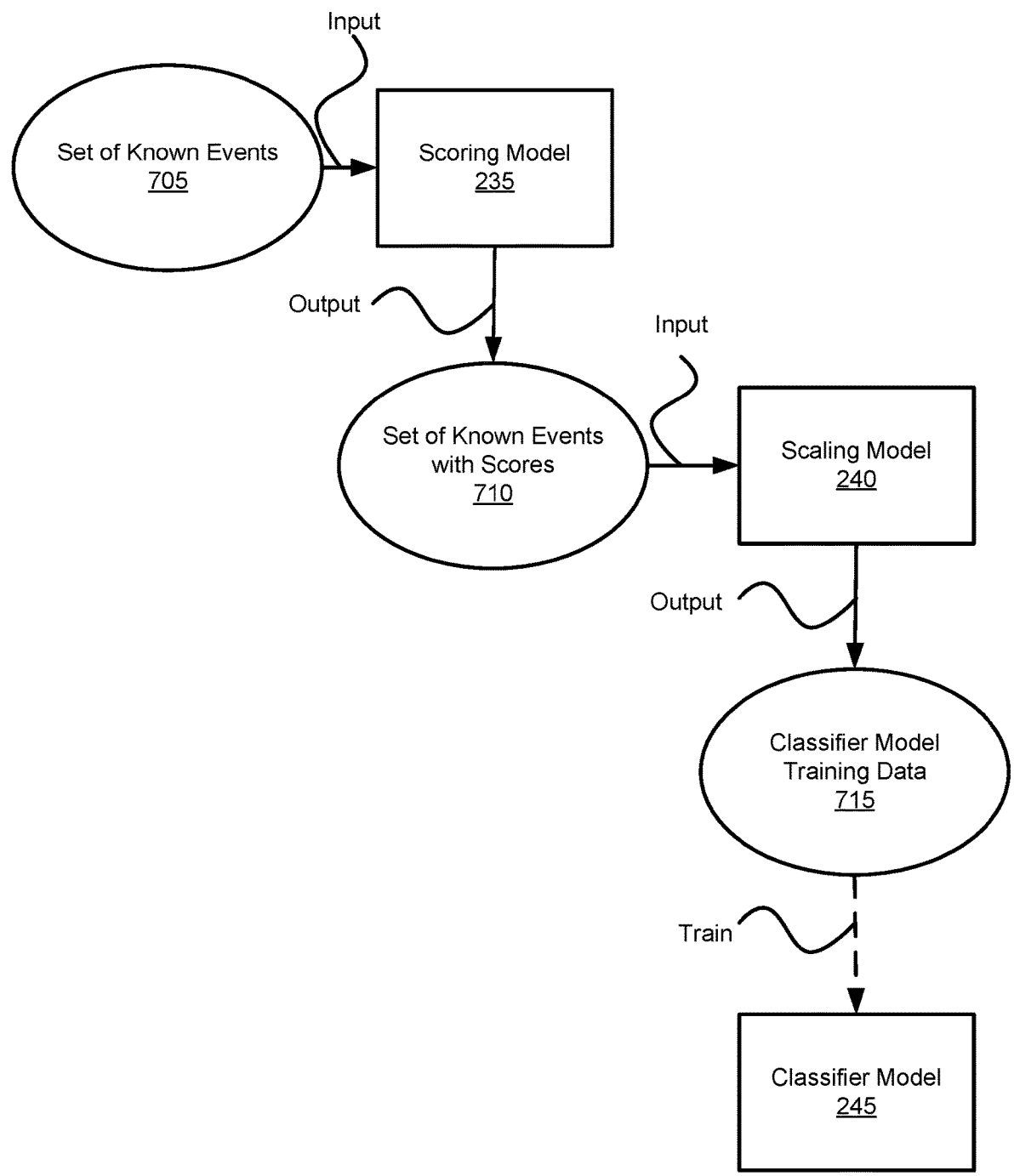
FIG. 7 is a diagram illustrating a method of generating classifier model training data, in accordance with an embodiment.

FIG. 7 is a diagram illustrating a method of generating classifier model training data 715, in accordance with an embodiment. A set of known events 705 are scored by the scoring model 235 to produce a set of known events with scores 710. The set of known events 705 can include any combination of synched events 320 and hindsight events 325. For example, the set of known events 705 is a set of hindsight events 325. The scores of the set of known events with scores 710 can be considered an initial set of training weights. The scores of the set of known events with scores 710 are scaled by the scaling model 240 to produce classifier model training data 715. The scaled scores produced by the scaling model 240 can be considered a calibration to the initial set of training weights. This produces a final set of training weights for the classifier model 245.

Since each access event in the classifier model training data 715 includes access events associated with users of the online system 140 (i.e. known events 315), the classifier model 245 can be trained to associate access events with users of the online system 140. Additionally, the final set of training weights can be used such that access events with higher scores have a greater impact on the training of the classifier model 245. In some embodiments, known events with characteristics similar to those of unsynched events 305 are assigned higher training weights than access events with characteristics similar to those of known events 315. In alternate embodiments, known events with characteristics similar to those of known events 315 (e.g., hindsight events 325) are assigned higher training weights than access events with characteristics similar to those of unsynched events 305.

Example Data Sets and Graph

Figure 8:
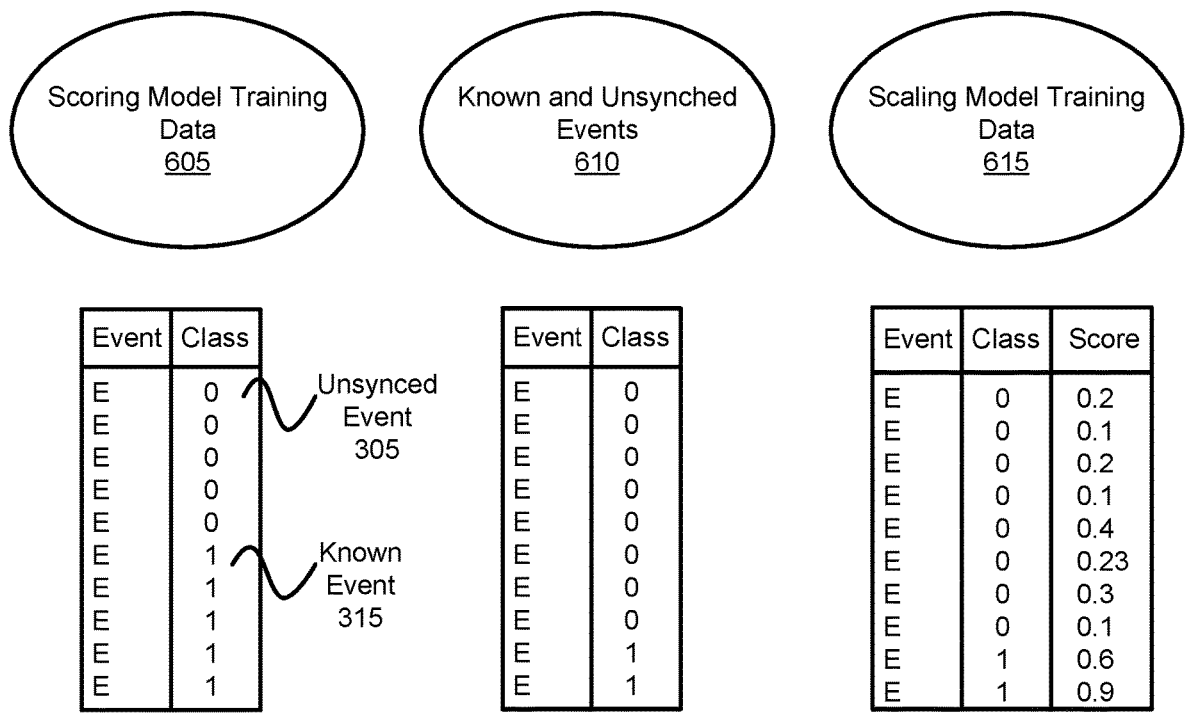
FIG. 8 is a diagram illustrating an example set of scoring model training data, an example set of known and unsynched events, and an example set of scaling model training data, in accordance with an embodiment.

FIG. 8 is a diagram illustrating an example set of scoring model training data 605, an example set of known and unsynched events 610, and an example set of scaling model training data 615, in accordance with an embodiment. Each example data set includes a column of access events and a classification (class) for each access event. A class score of "0" represents an unsynched event 305 and a class of "1" represents a known event 315. As mentioned above, the scoring model training data 605 can be sampled to include an equal portion of unsynched events 305 to known events 315. Thus, the example set in FIG. 8 includes five unsynched events 305 and five known events 315. Additionally, the set of known and unsynched events 610 can be unsampled. As a result, the example set of known and unsynched events 610 in FIG. 8 includes a ratio of unsynched events 305 to known events 315 that approximates a ratio of unsynched events 305 to known events 315 in the pool of access events, in this case 8:2. The example set of scaling model training data 615 includes the same access events as in the example set of known and unsynched events 610. Additionally, each access event in the scaling model training data 615 includes a score from the scoring model 235. These scores may be determined from characteristics that describe each access event. In FIG. 8, the scores reflect likelihoods of the access events being known events 315.

Figure 9:
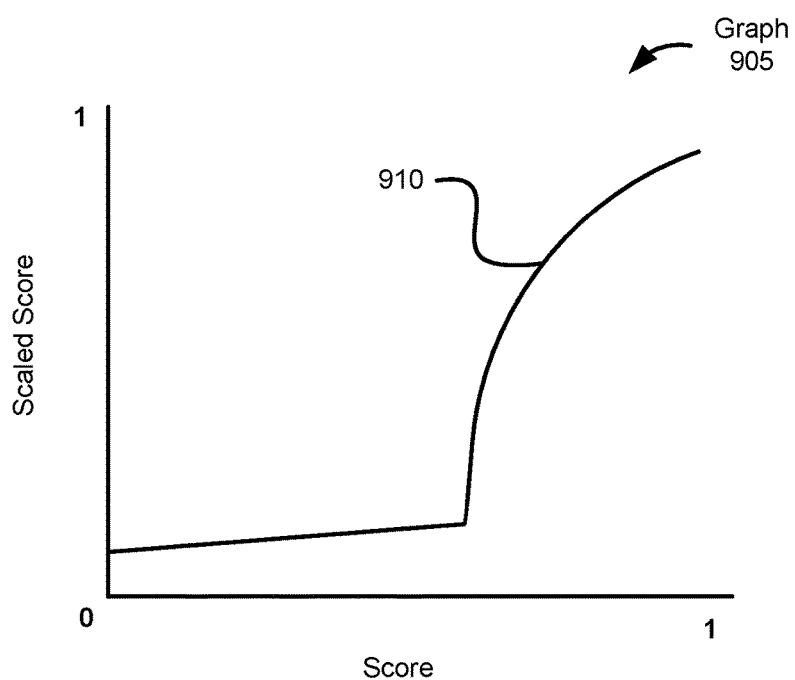
FIG. 9 is a graph used by the scaling model to scaling scores, in accordance with an embodiment.

FIG. 9 is a graph 905 used by the scaling model 240 to scaling scores, in accordance with an embodiment. The line 910 displays scaled scores as a function of scores from the scoring model 235. The shape of the line 910 may be determined by the scaling model training data 615, for example through Platt scaling. In the example of graph 905, access events with low scores (e.g., below 0.5) receive scaled down scores while access events with high scores (e.g., above 0.6) receive scaled up scores. The scaled scores reflect an adjusted likelihood of an access event being associated with a user of the online system 140. This likelihood is adjusted to account for the sampling bias inherent in the scores from the scoring model 235.

Figure 10:
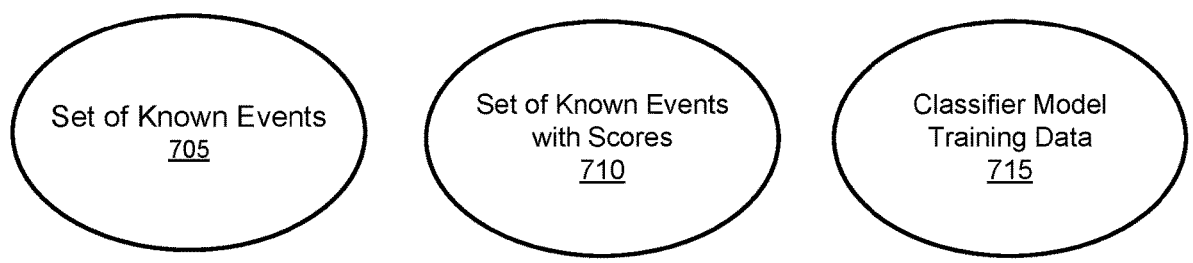
FIG. 10 is a diagram illustrating an example set of known events, an example set of known events with scores, and an example set of classifier model training data, in accordance with an embodiment.

FIG. 10 is a diagram illustrating an example set of known events 705, an example set of known events with scores 710, and an example set of classifier model training data 715, in accordance with an embodiment. Since the set of known events 705 only includes known events 315, the class score for each access event is "1." The scores for the example set of known events with scores 710 are determined by the scoring model 235 and reflect likelihoods of the access events being known events 315. These scores can be considered initial training weights 1005. The example set of classifier model training data 715 includes the same data as the example set of known events with scores 710. Additionally, each access event includes a scaled score (scaled) from the scaling model 240 (e.g., scaled according to the graph 905). The scaled scores can be considered final training weights 1010 for training the classifier model 245. The final training weights 1010 can affect the amount of influence each access event will have on training the classifier model 245.

Method of Training the Classifier Model

Figure 11:
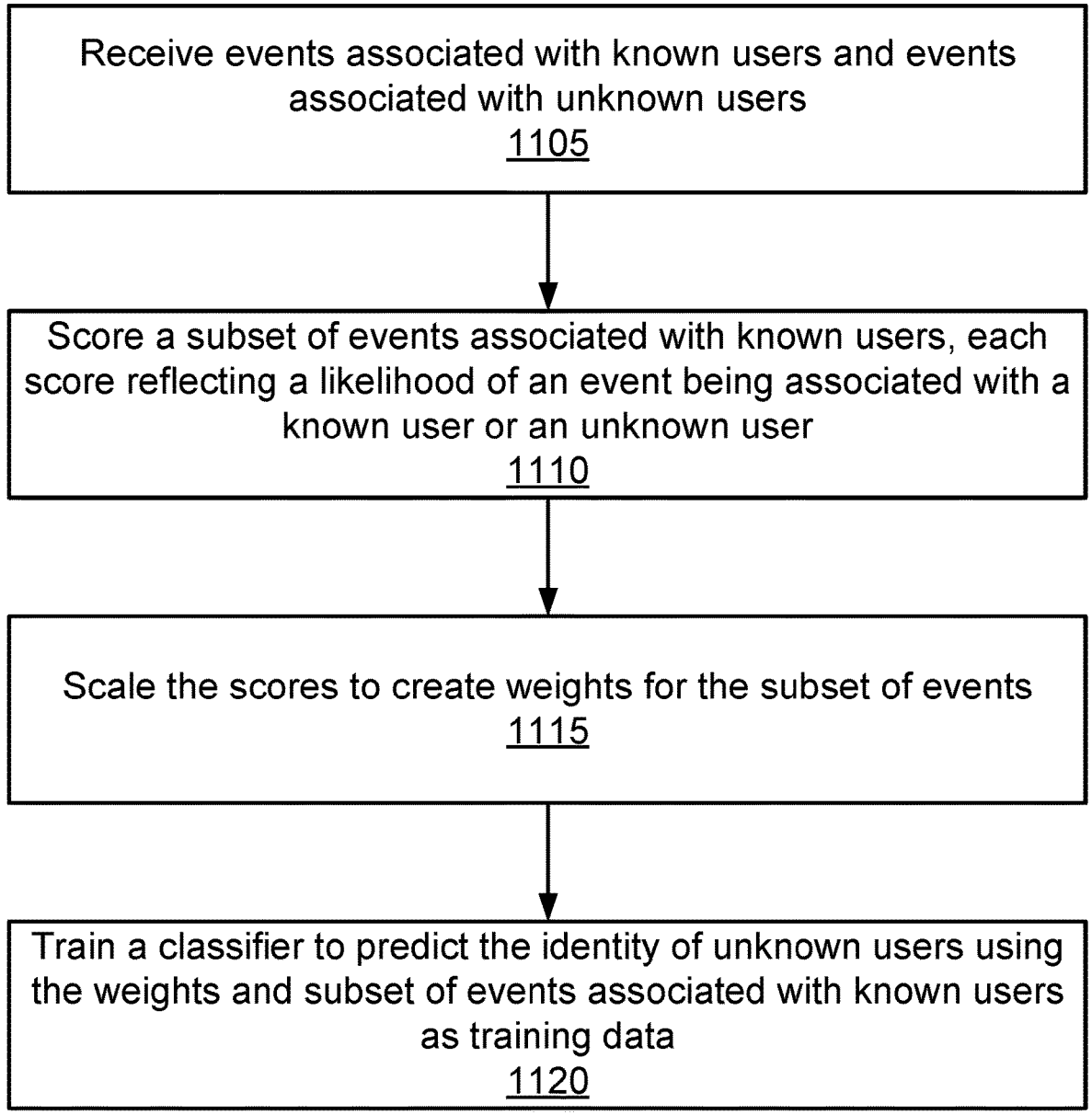
FIG. 11 is a flowchart of the process for training a classifier to predict the identity of unknown users from unsynched events, in accordance with an embodiment.

FIG. 11 is a flowchart of the process for training a classifier to predict the identity of unknown users from unsynched events, in accordance with an embodiment. The process may include different or additional steps than those described in conjunction with FIG. 11. The process may perform steps in different orders than the order described in conjunction with FIG. 11.

Access events associated with known users and access events associated with unknown users are received 1105. Each access event represents an interaction of a client device with content, such as content of an online system. A known user represents an access event associated with a user of a plurality of users of the online system and an unknown user represents an access event that is not associated with any user of the online system. In some embodiments, a known user is associated with an access event because the user was synchronized with the online system at a time the access event occurred. In some embodiments, a known user is not associated with an access event at a time the access event occurred. In some embodiments, a known user is associated with an access event at a time later than a time the access event occurred.

A subset of access events associated with known users is scored 1110. Each score reflects a likelihood of an access event being associated with a known user or an unknown user. The subset of access events is scored by a scoring model. In some embodiments, the scoring model is trained from a sampled subset of access events including a substantially equal proportion of access events associated with known users and access events associated with unknown users.

The scores are scaled 1115 by a scaling model to create training weights for the subset of access events. The scaling model is trained to scale the scores based on an unsampled ratio of access events having unknown users and known users. In some embodiments, the scaling model is trained by a ratio of access events associated with known users and access events associated with unknown users in the set of access events is identified. A second subset of access events having the identified ratio of access events is selected. The second subset of access events is scored by a scoring model. The scaling model is trained to scale a score for an access event based on the second subset of access events and the scores of the second subset of access events. In some embodiments, scaling model applies Platt scaling or logistic regression.

A classifier is trained 1120 to predict the identity of unknown users using the training weights and subset of access events associated with known users as training data. Specifically, the subset of access events are weighed in the training data according to the training weights associated with the access events. In some embodiments, for a given access event associated with an unknown user, the classifier selects users of the online system as candidates for the unknown user and ranks the candidates according to a likelihood of the candidates being the unknown user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a set of events each representing an interaction of a device with content and the set of events including events associated with known users and events associated with unknown users, wherein a known user represents an event associated with a user of a plurality of users of an online system and an unknown user represents an event that is not associated with any user of the online system;
   identifying a hindsight event, the hindsight event being an access event that is not associated with any user of the online system at a first time when the access event occurred but is associated with a known user of the online system at a second time that is after the first time;
   scoring, by a scoring model, a subset of events including at least the identified hindsight event, the subset of events associated with known users by applying a classifier that generates classification scores, each classification score reflecting a likelihood of an event being associated with a known user or an unknown user;
   scaling, by a scaling model, the scores associated with the subset of events to create training weights for the subset of events, the scaling model trained to scale the scores based on a ratio of unsampled events having unknown users and known users; and
   training a classifier to predict the identity of unknown users using the subset of events associated with known users as training data, wherein the subset of events are weighed in the training data according to the training weights associated with the events.

2. The method of claim 1, wherein a known user is associated with an event because the user was synchronized with the online system at a time the event occurred.

3. The method of claim 1, wherein a known user is associated with an event at a time later than a time the event occurred.

4. The method of claim 1, wherein a known user is not associated with an event at a time the event occurred.

5. The method of claim 1, wherein the scoring model is trained from a sampled subset of events including a substantially equal proportion of events associated with known users and events associated with unknown users.

6. The method of claim 1, wherein training the scaling model further includes:
   identifying a ratio of events associated with known users and events associated with unknown users in the set of events;
   selecting a second subset of events having the identified ratio of events;
   scoring the second subset of events by the scoring model; and
   training the scaling model to scale a score for an event based on the second subset of events and the scores of the second subset of events.

7. The method of claim 1, wherein the scaling model applies Platt scaling or logistic regression.

8. The method of claim 1, wherein training the classifier further comprises
   training the classifier to:
   for a given event associated with an unknown user, select users of the online system as candidates for the unknown user and rank the candidates according to a likelihood of the candidates being the unknown user.

9. A non-transitory computer-readable storage medium comprising stored instructions for:
   receiving a set of events each representing an interaction of a device with content and the set of events including events associated with known users and events associated with unknown users, wherein a known user represents an event associated with a user of a plurality of users of an online system and an unknown user represents an event that is not associated with any user of the online system;

identifying a hindsight event, the hindsight event being an access event that is not associated with any user of the online system at a first time when the access event occurred but is associated with a known user of the online system at a second time that is after the first time;

scoring, by a scoring model, a subset of events including at least the identified hindsight event, the subset of events associated with known and unknown users by applying a classifier that generates classification scores, each classification score reflecting a likelihood of an event being associated with a known user or an unknown user;

scaling, by a scaling model, the scores associated with the subset of events to create training weights for the subset of events, the scaling model trained to scale the scores based on a ratio of unsampled events having unknown users and known users; and training a classifier to predict the identity of unknown users with the subset of events associated with known users as training data, wherein the subset of events are weighed in the training data according to the training weights associated with the events.

10. The non-transitory computer-readable storage medium of claim 9, wherein a known user is associated with an event because the user was synchronized with the online system at a time the event occurred.

11. The non-transitory computer-readable storage medium of claim 9, wherein a known user is associated with an event at a time later than a time the event occurred.

12. The non-transitory computer-readable storage medium of claim 9, wherein a known user is not associated with an event at a time the event occurred.

13. The non-transitory computer-readable storage medium of claim 9, wherein the scoring model is trained from a sampled subset of events including a substantially equal proportion of events associated with known users and events associated with unknown users.

14. The non-transitory computer-readable storage medium of claim 9, wherein training the scaling model further includes:

identifying a ratio of events associated with known users and events associated with unknown users in the set of events;

selecting a second subset of events having the identified ratio of events;

scoring the second subset of events by the scoring model; and training the scaling model to scale a score for an event based on the second subset of events and the scores of the second subset of events.

15. The non-transitory computer-readable storage medium of claim 9, wherein the scaling model applies Platt scaling or logistic regression.

16. The non-transitory computer-readable storage medium of claim 9, wherein training the classifier further comprises training the classifier to:

for a given event associated with an unknown user, select users of the online system as candidates for the unknown user and rank the candidates according to a likelihood of the candidates being the unknown user.

17. A computer system comprising:

A computer processor; and a non-transitory computer-readable storage medium comprising stored instructions executable by the computer processor for:

receiving a set of events each representing an interaction of a device with content and the set of events including events associated with known users and events associated with unknown users, wherein a known user represents an event associated with a user of a plurality of users of an online system and an unknown user represents an event that is not associated with any user of the online system;

identifying a hindsight event, the hindsight event being an access event that is not associated with any user of the online system at a first time when the access event occurred but is associated with a known user of the online system at a second time that is after the first time;

scoring, by a scoring model, a subset of events including at least the identified hindsight event, the subset of events associated with known and unknown users by applying a classifier that generates classification scores, each classification score reflecting a likelihood of an event being associated with a known user or an unknown user;

scaling, by a scaling model, the scores associated with the subset of events to create training weights for the subset of events, the scaling model trained to scale the scores based on a ratio of unsampled events having unknown users and known users; and training a classifier to predict the identity of unknown users with the subset of events associated with known users as training data, wherein the subset of events are weighed in the training data according to the training weights associated with the events.

18. The computer system of claim 17, wherein a known user is associated with an event because the user was synchronized with the online system at a time the event occurred.

19. The computer system of claim 17, wherein a known user is associated with an event at a time later than a time the event occurred.

20. The computer system of claim 17, wherein a known user is not associated with an event at a time the event occurred.

* * * * *